(12) United States Patent
Iida et al.

(10) Patent No.: US 6,646,961 B1
(45) Date of Patent: Nov. 11, 2003

(54) OPTICAL RECORDING MEDIUM DRIVING APPARATUS

(75) Inventors: Koichi Iida, Kawasaki (JP); Sumio Kuroda, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/545,869

(22) Filed: Apr. 6, 2000

Related U.S. Application Data

(63) Continuation of application No. PCT/JP98/04743, filed on Oct. 19, 1998.

(30) Foreign Application Priority Data

Oct. 20, 1997 (JP) .............................................. 9-287475

(51) Int. Cl.$^7$ ................................................ G11B 7/09
(52) U.S. Cl. ............................... 369/44.26; 369/30.13; 369/44.28; 369/44.34; 369/44.41
(58) Field of Search ........................... 369/30.13, 44.26, 369/44.28, 44.29, 44.34, 44.35, 44.41, 53.28

(56) References Cited

U.S. PATENT DOCUMENTS

| | | | | |
|---|---|---|---|---|
| 4,504,937 A | | 3/1985 | Yonezawa et al. | 369/44 |
| 4,607,358 A | | 8/1986 | Maeda et al. | 369/44 |
| 5,130,967 A | * | 7/1992 | Tanaka et al. | 369/53.28 |
| 5,181,195 A | * | 1/1993 | Kume et al. | 369/44.41 |
| 5,896,354 A | * | 4/1999 | Yamashita et al. | 369/44.34 |
| 5,926,445 A | * | 7/1999 | Sasaki et al. | 369/44.25 |
| 5,978,327 A | | 11/1999 | Kuroda et al. | 369/44.26 |

FOREIGN PATENT DOCUMENTS

| | | |
|---|---|---|
| EP | 080212 | 6/1983 |
| EP | 141396 | 5/1985 |
| EP | 0305979 | 8/1988 |
| EP | 0320975 | 6/1989 |
| EP | 0752701 | 1/1997 |
| EP | 0779613 | 6/1997 |
| JP | 573232 | 1/1982 |
| JP | 5891536 | 5/1983 |
| JP | 58169370 | 10/1983 |
| JP | 63122024 | 5/1988 |
| JP | 1169742 | 7/1989 |
| JP | 1079125 | 3/1998 |
| JP | 10269593 | 10/1998 |
| KR | 88999 | 6/1988 |

* cited by examiner

*Primary Examiner*—Richemond Dorvil
*Assistant Examiner*—Jorge L. Ortiz-Criado
(74) *Attorney, Agent, or Firm*—Greer, Burns & Crain, Ltd.

(57) ABSTRACT

An optical recording medium driving apparatus which can obtain a tracking error signal necessary for an accurate track count. An optical recording medium driving apparatus for recording and/or reproducing data in/from an optical recording medium, where information can be recorded in plural tracks formed by land portions and groove portions provided between the land portions, based on a light emitted to the tracks. The apparatus includes a detector for detecting a position of the emitted light, a peak-hold circuit for holding a peak of a position detected signal outputted from the detector so as to output the position detected signal, a bottom-hold circuit for holding a bottom of the position detected signal so as to output the position detected signal, and a switching circuit for switching signals based on the output signals from the peak-hold circuit and bottom-hold circuit so as to output either signal.

6 Claims, 9 Drawing Sheets

A BLOCK DIAGRAM SHOWING A SECOND EMBODIMENT OF THE OPTICAL RECORDING MEDIUM DRIVING APPARATUS ACCORDING TO THE PRESENT INVENTION

A DRAWING SHOWING A DIFFRACTED LIGHT
WHICH ENTERS A TWO-PIECE DETECTOR

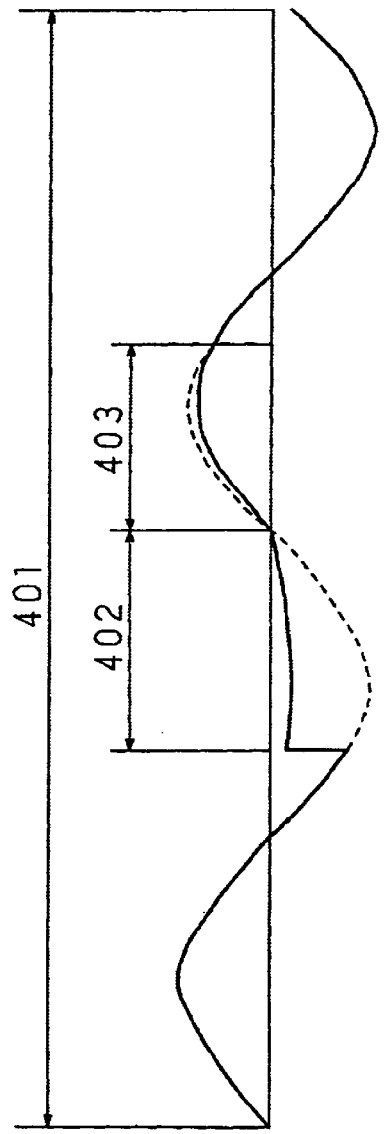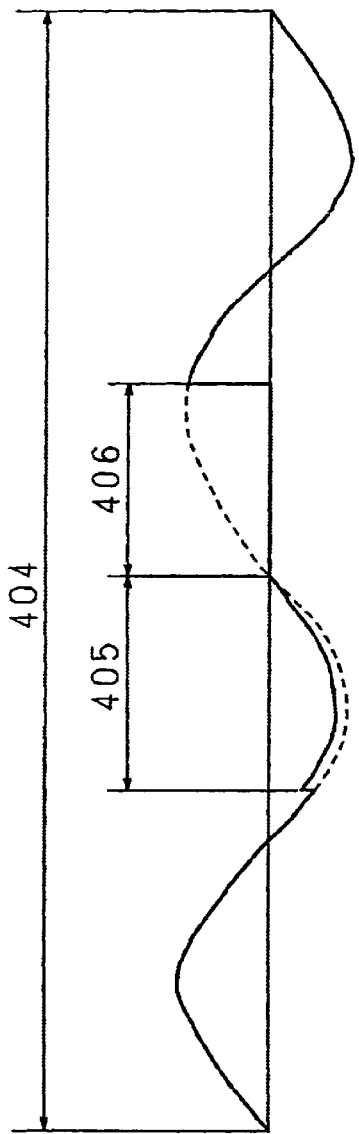
FIG. 5A
FIG. 5B
A WAVEFORM CHART SHOWING TES OBTAINED BY AN OPTICAL RECORDING MEDIUM DRIVING APPARATUS ACCORDING TO THE PRESENT INVENTION

OPTICAL RECORDING MEDIUM DRIVING APPARATUS

This is a continuation, of International Application No. PCT/JP98/04743, which has an international filing date of Oct. 19, 1998.

FIELD OF THE INVENTION

The present invention relates to an optical recording medium driving apparatus adopting a land/groove recording system which makes high-density recording possible by changing height of adjacent tracks.

DESCRIPTION OF RELATED ART

In recent years, as the performance of computers becomes higher, the demand of large-capacity memory becomes higher. Therefore, optical disks and magneto-optical disks have been produced. However, higher capacity is demanded for the future multimedia eras.

For example, DVD-ROM (Digital Video Disc-ROM) has been put to practical use, and thus a rewritable recording medium whose capacity corresponds to that of such a DVD-ROM is required. One of the techniques to achieve storage capacity corresponding to that of the DVD-ROM is an optical disk using a land/groove recording system.

A rewritable optical disk conventionally adopted a land recording system or groove recording system. However, such recording systems are now being shifted to the land/groove recording system which can achieve higher-density recording.

In the land recording system whose storage capacity is up to 640 MB, a track count at the time of seek was carried out by a cross tracking signal which is generated when crossing a track. However, in the land/groove recording system, since the cross tracking signal is 0, this signal cannot be used.

Therefore, in the land/groove recording system, it is considered that the track count is carried out by a tracking error signal (TES). Moreover, in the land/groove recording system, since an ID prepit of a recording pattern becomes shallow, it is necessary to enlarge a pit so that sufficient signal strength can be obtained. However, when the pit is enlarged, the tracking error signal in the ID section becomes weak, and thus track miscount occurs.

FIG. 1 is a block diagram showing a constitutional example of a conventional optical recording medium driving apparatus for recording and/or reproducing data using an optical disk adopting the land/groove recording system. This optical recording medium driving apparatus is schematically shown mainly a tracking error signal detecting part. After a light outputted from a laser 111 is shaped to a parallel circular beam by using a beam shaping device, the light passes through a beam splitter 112 and its optical path is bent by a rising mirror 113. Thereafter, the light is condensed by an objective lens 114 so as to be emitted onto a surface of a disk 110.

The light diffracted by a groove on the surface of the disk 110 passes through the objective lens 114 again. Then the light is reflected by the beam splitter 112 so that its optical path is bent, and the light enters a two-piece detector 115.

FIG. 2 is a drawing showing the diffracted light which enters the two-piece detector, and it shows a state of the two-piece detector in FIG. 1 viewed from an upper surface (detecting surface). As for the two-piece detector 115, its two-piece detecting portions are provided in the right-and-left direction of FIG. 1. Two lights (first-order diffracted lights $D_1$), which are diffracted by both edges of the groove, are diffracted in the right-and-left direction at a predetermined angle so that portions of the first-order diffracted lights $D_1$ enter the detecting portions on the right and left sides. Moreover, a zero-order diffracted light $D_0$ enters the central portion of the two-piece detector 115 with it going over both of the detecting portions. Distribution of the light intensity occurs in an area where the zero-order and first-order diffracted lights $D_0$ and $D_1$ are overlapped (cross hatching section in FIG. 2) due to an interference effect caused by track shifting. The respective detecting portions detect the light intensity utilizing this distribution. The two-piece detector 115 converts the lights, which are inputted after divided into two, into current signals, and inputs them into current/voltage converting circuits 116 and 117.

The current/voltage converting circuits 116 and 117 respectively convert the inputted current signals into voltage signals so as to output them.

The voltage signals outputted respectively from the current/voltage converting circuits 116 and 117 are amplified by amplifiers 118 and 119, and a difference signal is generated in a differential amplifier 122. The difference signal is outputted as a tracking error signal. The objective lens 114 is automatically tracked based on the tracking error signal and the seek is again carried out.

FIG. 3 is a drawing showing an example of the ID section of the optical disk adopting the land/groove recording system suggested by the applicant of the present invention, and FIG. 3 shows a plan view (see Japanese Patent Application Laid-Open No. 10-79125 (1998)). Here, the hatching section is a portion which is formed into a concave shape.

On this optical disk, information can be recorded in tracks formed by land portions 102 and groove portions 101 provided between the land portions 102. Rows of prepits 104 and 103, which correspond to pre-format information of the adjacent land portion 102 and groove portion 101, are formed with them being shifted in the circumferential direction.

Count grooves 106 for counting tracks are formed on both sides of the rows of the prepits 104 for the land portions 102, and through grooves 105, which go through the rows of the prepits 103 for the groove portions 101, are formed.

FIG. 4 is a waveform chart showing TES (tracking error signal) obtained by the conventional optical recording medium driving apparatus. In the case where a tracking error signal 201 at the time of seek is created from such an optical disk by the optical recording medium driving apparatus shown in FIG. 1, as shown in FIG. 3, the strength of a TES 202 of the ID section (a dotted line shows a strength of the tracking error signal 201 obtained not in the ID section but in the recording domain) is weakened due to the prepit 104 compared with the tracking error signal in the recording domain, and it crosses the zero line. Therefore, there arises a problem that track miscounts occurs.

The present invention has been achieved in order to solve the above problem, and it is an object of the present invention to provide an optical recording medium driving apparatus which can obtain a tracking error signal necessary for an accurate track count.

SUMMARY OF THE INVENTION

An optical recording medium driving apparatus according to the present invention for recording and/or reproducing data in/from an optical recording medium, where information can be recorded in plural tracks, based on a light emitted to the tracks of the optical recording medium, is constituted so as to have a detector for detecting a position of the emitted light, a peak-hold circuit for holding a peak of a position detected signal outputted from the detector so as to output the position detected signal, a bottom-hold circuit for outputting a bottom of the position detected signal so as to output the position detected signal, and a switching circuit for switching signals based on the output signals from the peak-hold circuit and bottom-hold circuit so as to output either signal. The optical recording medium driving apparatus is constituted so that the signal outputted from the switching circuit is used as a tracking error signal.

In this optical recording medium driving apparatus, the peak-hold circuit holds a peak of the signal outputted from the position detector so as to output the signal, and the bottom-hold circuit holds a bottom of the signal outputted from the position detector so as to output the signal. The switching circuit switches signals based on the output signals from the peak-hold circuit and bottom-hold circuit so as to output either signal, and the signal is used as a tracking error signal. As a result, a tracking error signal necessary for the accurate track count can be obtained.

Another optical recording medium driving apparatus according the present invention is constituted so that the switching circuit includes an absolute value circuit for outputting an absolute value of the signal based on the output signal from the peak-hold circuit, an absolute value circuit for outputting an absolute value of the signal based on the output signal. from the bottom-hold circuit, and a comparison circuit for comparing the absolute values outputted from the absolute value circuits so as to select either signal with the larger absolute value. The optical recording medium driving apparatus is constituted so that the switching circuit outputs the signal selected by the comparison circuit, and tracking servo and seek are carried out.

In this optical recording medium driving apparatus, the two absolute value circuits output respectively the absolute value of the signal based on the output signal from the peak-hold circuit and the absolute value of the signal based on the output signal from the bottom-hold circuit. The comparison circuit compares the absolute values outputted by the absolute value circuits, and the switching circuit outputs either signal with the larger absolute value.

Here, as for ID for land/groove recording which is effective for adoption to the present invention, the ID is formed as a prepit on the extension of the land and on the extension of the groove.

FIG. 5 is a waveform chart showing TES obtained by the optical recording medium driving apparatus according to the present invention. The signal based on the output signal from the peak-hold circuit, as shown in FIG. 5A, becomes a signal 403 whose fall due to the prepit of the ID section in the land portion was recovered. The signal based on the output signal from the bottom-hold circuit, as shown in FIG. 5B, becomes a signal 405 whose fall due to the prepit of the ID section in the groove portion was recovered. Here, a dotted line in the drawing is a reproduction waveform when the light spot crosses not the ID section but the land/groove. Therefore, in the ID section of the land portion, amplitude of the signal 403 based on the output signal from the peak-hold circuit becomes larger than the other, and in the ID section of the groove portion, amplitude of the signal 405 based on the output signal from the bottom-hold circuit becomes larger than the other. When the signal whose amplitude is larger than the other is selected, namely, the signal whose fall in the ID section was recovered is selected, the waveform becomes closer to that of the portions other than the ID section. As a result, a tracking error signal necessary for the accurate track count can be obtained.

Here, the two-piece detector is used as the aforementioned position detector, and the two peak-hold circuits and two bottom-hold circuits hold peaks and bottoms of the two signals outputted from the two-piece detector so as to output the signals. The switching circuit switches the signals based on the output signals from the two peak-hold circuits and signals based on the output signals from the two bottom-hold circuits so as to output the signals. These signals can used as a tracking error signal.

Further, the optical recording medium driving apparatus can be constituted as follows. Namely, one absolute value circuit outputs an absolute value of the signal based on the difference signal of the output signals from the two peak-hold circuits, and the other absolute value circuit outputs an absolute value of the signal. based on the difference signal of the output signals from the two bottom-hold circuits. The comparison circuit compares the absolute values outputted from the absolute value circuits and outputs either signal with the larger absolute value.

Still another optical recording medium driving apparatus according to the present invention for recording and/or reproducing data in/from an optical recording medium, where information can be recorded in plural tracks, based on a light emitted to the tracks of the optical recording medium, includes a detector for detecting positions of the emitted light, a peak-hold circuit for holding a peak of a difference signal of position detected signals outputted from the detector so as to output the difference signal, a bottom-hold circuit for holding a bottom of the difference signal so as to output the difference signal, and a switching circuit for switching the output signals from the peak-hold circuit and bottom-hold circuit so as to output either output signal. The optical recording medium driving apparatus is constituted so that the signal outputted from the switching circuit is used as a tracking error signal.

In this optical recording medium driving apparatus, the peak-hold circuit holds a peak of the difference signal of the position detected signals from the detector and outputs the difference signal, and the bottom-hold circuit holds a bottom of the difference signal of the position detected signals outputted from the detector and outputs the difference signal. The switching circuit switches the output signals from the peak-hold circuit and bottom-hold circuit and outputs either output signal, and the signal is used as a tracking error signal. As a result, a tracking error signal necessary for the accurate track count can be obtained.

Still another optical recording medium driving apparatus according to the present invention is constituted so that the switching circuit includes an absolute value circuit for outputting an absolute value of the output signal from the peak-hold circuit, an absolute value circuit for outputting an absolute value of the output signal from the bottom-hold circuit, and a comparison circuit for comparing the absolute values outputted from the absolute value circuits so as to select either signal with the larger absolute value. The switching circuit outputs the signal with the larger absolute value selected by the comparison circuit.

In this optical recording medium driving apparatus, the two absolute value circuits output respectively absolute values of the output signals from the peak-hold circuit and bottom-hold circuit. The comparison circuit compares the absolute values outputted from the absolute value circuits and selects either signal with the larger absolute value, and the switching circuit outputs the selected signal.

As shown in FIG. 5A, the output signal from the peak-hold circuit becomes a signal 403 whose fall due to a prepit of the ID section in the land portion was recovered, and as shown in FIG. 5B, the output signal from the bottom-hold circuit becomes a signal 405 whose fall due to the prepit of the ID section in the groove portion was recovered. Therefore, in the ID section of the land portion, amplitude of the output signal 403 from the peak-hold circuit becomes larger than the other, and in the ID section of the groove portion, amplitude of the output signal 405 from the bottom-hold circuit becomes larger than the other. When the output signal whose amplitude is larger than the other is selected, namely, the signal whose fall was recovered is selected, a tracking error signal necessary for the accurate track count can be obtained.

Still another optical recording medium driving apparatus according to the present invention for recording and/or reproducing data in/from an optical recording medium, where information can be recorded in plural tracks, based on a light emitted to the tracks of the optical recording medium, said driving apparatus is constituted so as to have a detector for detecting a position of the emitted light, and a low-pass filter for removing a frequency component generated due to prepits provided in the optical recording medium from a position detected signal outputted from the detector, and so that a signal based on an output from the low-pass filter is used as a tracking error signal.

In this optical recording medium driving apparatus, the low-pass filter filters the position detected signal outputted from the detector to remove high frequency component generated due to the prepit, and recovers the fall portions, where the frequency is comparatively high and which are generated in the ID sections of the land portion and groove portion, and the signal based on the output signal from the low-pass filter is used as a tracking error signal. Therefore, a tracking error signal necessary for the accurate track count can be obtained.

Still another optical recording medium driving apparatus according to the present invention for recording and/or reproducing data in/from an optical recording medium, where information can be recorded in plural tracks, based on a light emitted to the tracks of the optical recording medium, said driving apparatus is constituted so as to have a two-piece detector for detecting positions of the emitted light, and a low-pass filter for removing a frequency component due to prepits provided in the optical recording medium from position detected signals outputted by the two-piece detector, and so that a signal based on an output from the low-pass filter is used as a tracking error signal.

In this optical recording medium driving apparatus, the low-pass filter filters the difference signal of the position detected signals outputted from the two-piece detector to remove high frequency component generated due to the prepit, and recovers the fall portions, where the frequency is comparatively high and which are generated in the ID sections of the land portion and groove portion, and the signal based on the output from the low-pass filter is used as a tracking error signal. Therefore, a tracking error signal necessary for the accurate track count can be obtained.

BRIEF DESCRIPTION OF THE DRAWINGS

FIG. 5 is a waveform chart showing TES obtained by an optical. recording medium driving apparatus according to the present invention;

DETAILED DESCRIPTION OF THE PREFERRED EMBODIMENTS

There will be detailed below the preferred embodiments of the present invention with reference to the drawings.

First Embodiment

Figure 6:
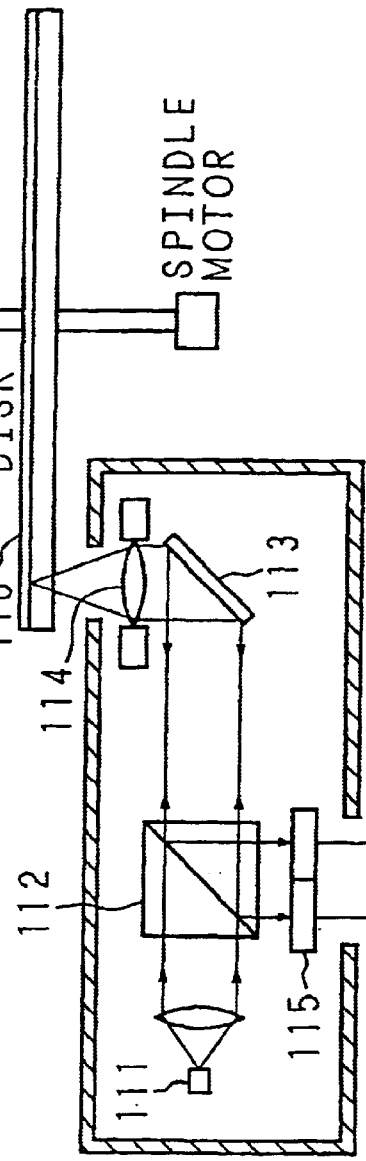
FIG. 6 is a block diagram showing a first embodiment of the optical recording medium driving apparatus according to the present invention.
Figure 6:
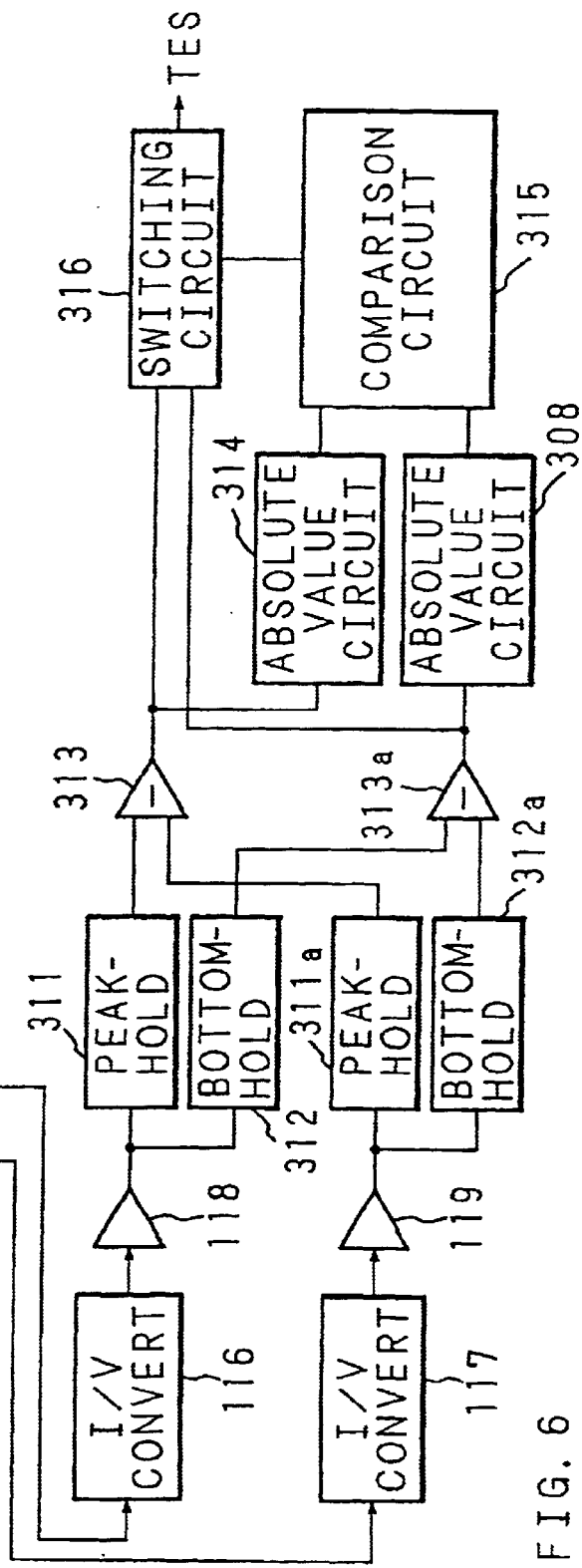

FIG. 6 is a block diagram showing a first embodiment of the optical recording medium driving apparatus according to the present invention. This driving apparatus (optical recording medium driving apparatus) is schematically shown mainly a detecting part for a tracking error signal (TES). After a light outputted from a laser 111 is shaped to a parallel circular beam by using a beam shaping device, the light passes through a beam splitter 112 and its optical path is bent by a rising mirror 113. Thereafter, the light is condensed by an objective lens 114 so as to be emitted onto a surface of a disk 110.

The light diffracted by a groove on the surface of the disk 110 passes through the objective lens 114 again. Then the light is reflected by the beam splitter 112 so that its optical path is bent, and the light enters a two-piece detector 115.

Figure 1:
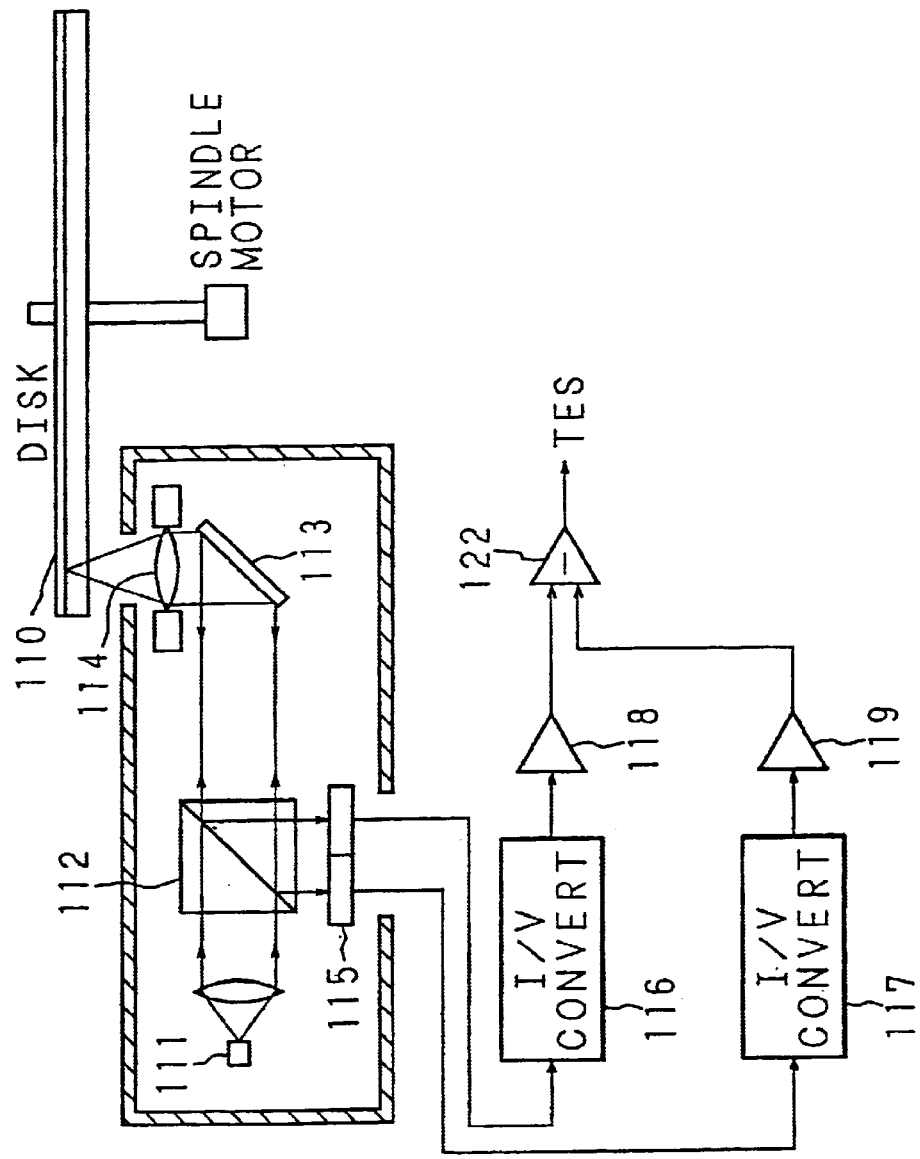
FIG. 1 is a block diagram showing a constitutional example of a conventional optical recording medium driving apparatus.
Figure 2:
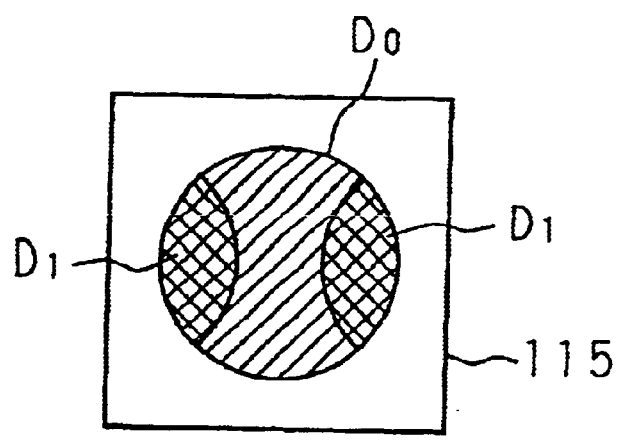
FIG. 2 is a drawing showing a diffracted light which enters a two-piece detector.

As for the two-piece detector 115, as shown in FIG. 2, its two-piece detecting portions are provided in the right-and-left direction of FIG. 1. Two lights (first-order diffracted lights $D_1$), which are diffracted by both edges of the groove, are diffracted in the right-and-left direction at a predetermined angle so that portions of the first-order diffracted lights $D_1$ enter the detecting portions on the right and left sides. Moreover, a zero-order diffracted light $D_0$ enters the central portion of the two-piece detector 115 with it going over both of the detecting portions. Distribution of the light intensity occurs in an area where the zero-order and first-order diffracted lights $D_0$ and $D_1$ are overlapped (cross hatching section in FIG. 2) due to an interference effect caused by track shifting. The respective detecting portions detect the light intensity utilizing this distribution.

The two-piece detector 115 converts the lights, which were divided into two so as to be inputted, into current signals, and inputs them into current/voltage converting circuits 116 and 117.

The current/voltage converting circuits 116 and 117 respectively convert the inputted current signals into voltage signals so as to output them.

The voltage signals outputted respectively from the current/voltage converting circuits 116 and 117 are amplified by amplifiers 118 and 119. The voltage signal amplified by the amplifier 118 is given to a peak-hold circuit 311 and bottom-hold circuit 312, and its peak and bottom are held so that the signals are outputted therefrom. The voltage signal amplified by the amplifier 119 is given to a peak-hold circuit 311a and a bottom-hold circuit 312a, and its peak and bottom are held so that the signals are outputted therefrom.

The voltage signals, which were outputted from the peak-hold circuits 311 and 311a where their peak was held, are inputted into a differential amplifier 313, and the differential amplifier 313 outputs a difference signal of the voltage signals so as to give the difference signal to a switching circuit 316 and absolute value circuit 314.

The voltage signals, which were outputted from the bottom-hold circuits 312 and 312a where their bottom was held, are inputted into a differential amplifier 313a, and the differential amplifier 313a outputs a difference signal of the voltage signals so as to give the difference signal to the switching circuit 316 and absolute value circuit 308.

The absolute values outputted by the absolute value circuits 308 and 314 are given to a comparison circuit 315. The compared result of the comparison circuit 315 is given to the switching circuit 316, and the switching circuit 316 outputs one of the difference signals outputted by the differential amplifiers 313 and 313a, whose compared result of the comparison circuit 315 is larger than the other, as a tracking error signal. The objective lens 114 is automatically tracked based on the tracking error signal, and the seek is again carried out.

Figure 3:
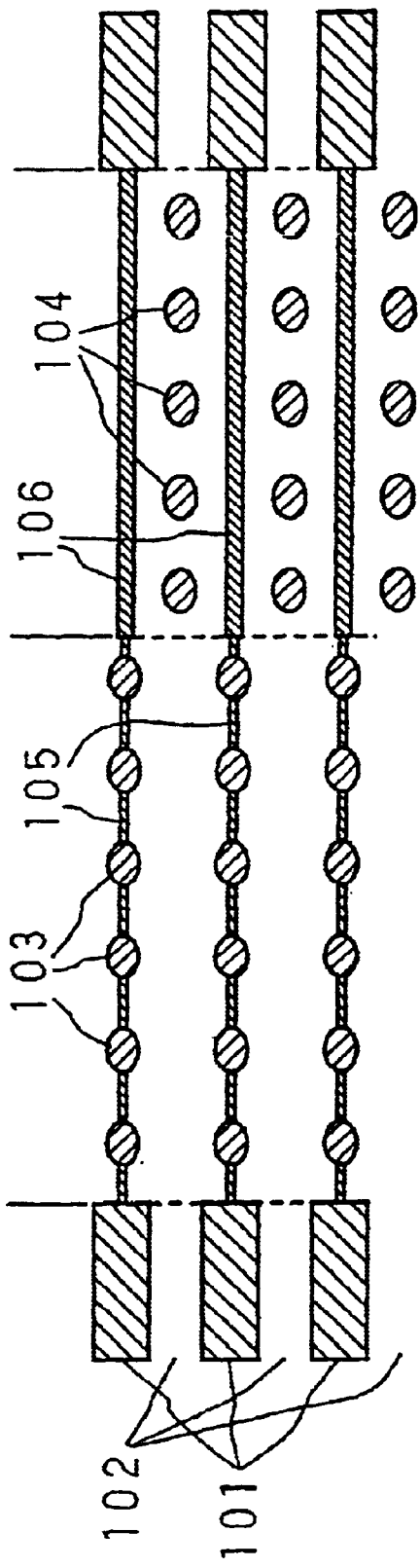
FIG. 3 is a drawing showing an example of an ID section of an optical disk.
Figure 4:
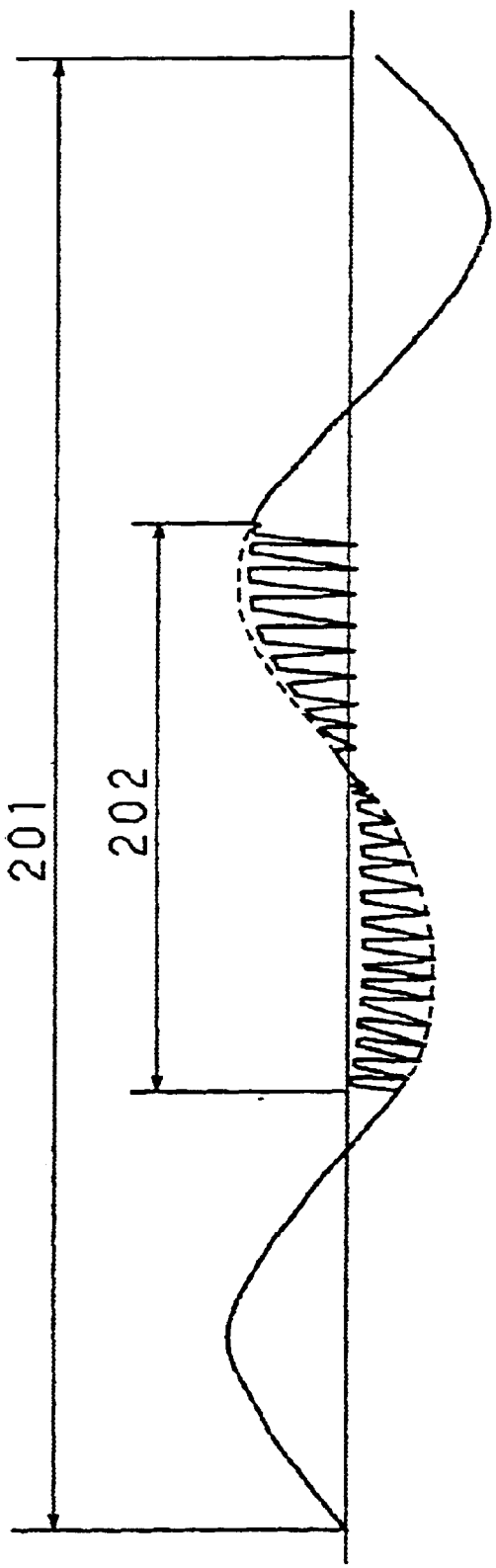
FIG. 4 is a waveform chart showing TES obtained by the conventional optical recording medium driving apparatus.

As shown in FIG. 3, on this optical disk, information can be recorded in tracks formed by land portions 102 and groove portions 101 provided between the land portions 102. Rows of prepits 104 and 103, which correspond to pre-format information of the adjacent land portion 102 and groove portion 101, are formed with them being shifted in the circumferential direction.

Count grooves 106 for counting tracks are formed on both sides of the rows of the prepits 104 for the land portions 102, and through grooves 105, which go through the rows of the prepits 103 for the groove portions 101, are formed.

In the case where tracking error signals 401 and 404 at the time of seek are created from the optical disk by the driving apparatus shown in FIG. 6, a difference signal, which was outputted by the differential amplifier 313 and is a signal based on the output signals from the peak-hold circuits 311 and 311a, becomes, as shown in FIG. 5A, a signal 403 whose fall due to the prepit 104 of the ID section in the land portion was recovered (however, the fall 402 due to the through groove 105 of the ID section in the groove portion cannot be recovered).

A difference signal, which is the signal based on the output signals from the bottom-hold circuits 312 and 312a and was outputted from the differential amplifier 313a, becomes, as shown in FIG. 5B, a signal 405 whose fall due to the through groove 105 of the ID section in the groove portion was recovered (however, the fall 406 due to the prepit 104 of the ID section in the land portion cannot be recovered).

Therefore, as for the compared result of the comparison circuit 315, in the signals 403 and 406 of the ID sections in the land portion, amplitude of the signal (403) based on the output signals from the peak-hold circuits 311 and 311a becomes larger than the other, and in the signals 402 and 405 of the ID section in the groove portion, amplitude of the signal (405) based on output signals from the bottom-hold circuits 312 and 312a becomes lager than the other. The switching circuit 315 selects either signal whose amplitude is lager than the other, namely, selects either signal whose fall was recovered. Therefore, a tracking error signal necessary for the accurate track count can be obtained.

Second Embodiment

Figure 7:
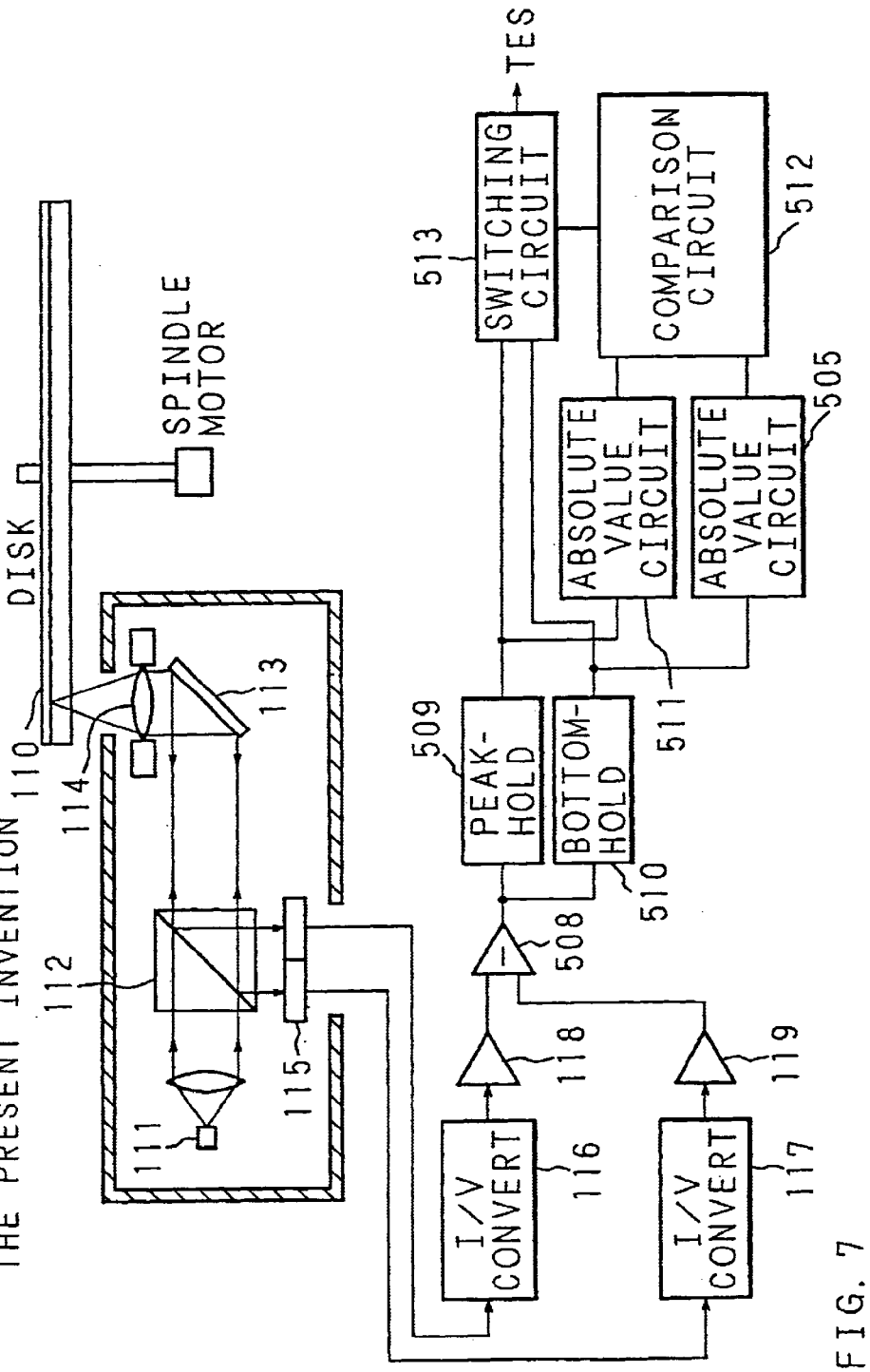
FIG. 7 is a block diagram showing a second embodiment of the optical recording medium driving apparatus according to the present invention.

FIG. 7 is a block diagram showing a second embodiment of the optical recording medium driving apparatus according to the present invention. In this driving apparatus (optical recording medium driving apparatus), voltage signals outputted from the current/voltage converting circuits 116 and 117 are amplified by the amplifiers 118 and 119. The voltage signals amplified by the amplifiers 118 and 119 are inputted into a differential amplifier 508, and the differential amplifier 508 outputs a difference signal of the voltage signals so as to give the difference signal to a peak-hold circuit 509 and bottom-hold circuit 510.

The voltage signal, whose peak was held by the peak-hold circuit 509 and which was outputted, is given to a switching circuit 513 and absolute value circuit 511.

The voltage signal, whose bottom was held by the bottom-hold circuit 510 and which was outputted, is given to the switching circuit 513 and absolute value circuit 505.

Absolute values outputted by the absolute value circuits 505 and 511 are given to a comparison circuit 512. The compared result of the comparison circuit 512 is given to the switching circuit 513, and the switching circuit 513 outputs the voltage signal, which was outputted by the peak-hold circuit 509 or bottom-hold circuit 510 and whose compared result of the comparison circuit 512 is lager than the other, as a tracking error signal. The objective lens 114 is automatically tracked based on this tracking error signal, and the seek is again carried out. Since the other parts of the constitution are the same as those of the aforementioned driving apparatus in FIG. 6, the description thereof is omitted.

In the case where the tracking error signal at the time of seek is created from the optical disk shown in FIG. 3 by the driving apparatus having such a constitution, the output signal of the peak-hold circuit 509, as shown in FIG. 5A, becomes a signal 403 whose fall due to the prepit 104 of the ID section in the land portion was recovered (however, the fall 402 due to the through groove 105 of the ID section in the groove portion cannot be recovered).

The output signal of the bottom-hold circuit 510, as shown in FIG. 5B, becomes a signal 405 whose fall due to the through groove 105 of the ID section in the groove portion was recovered (however, the fall 406 due to the prepit 104 of the ID section in the land portion cannot he recovered).

Therefore, as for the compared result of the comparison circuit 512, in the output signals 403 and 406 of the ID section in the land portion, amplitude of the output signal (403) from the peak-hold circuit becomes larger than the other, and in the output signals 402 and 405 of the ID section in the groove portion, amplitude of the output signal (405) from the bottom-hold circuit becomes larger than the other. The switching circuit 512 selects either signal whose amplitude is larger than the other, namely, selects either signal whose fall was recovered. Therefore, a tracking error signal necessary for the accurate track count can be obtained.

Third Embodiment

Figure 8:
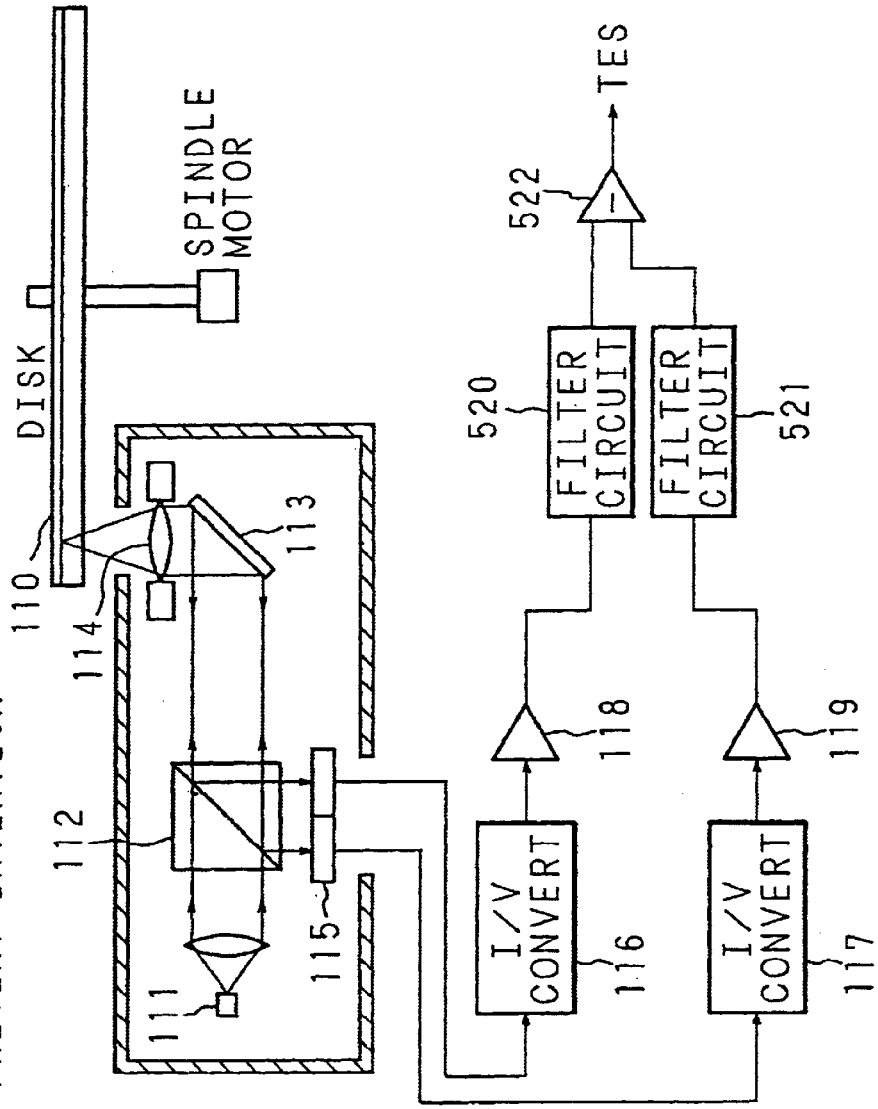
FIG. 8 is a block diagram showing a third embodiment of the optical recording medium driving apparatus according to the present invention.

FIG. 8 is a block diagram showing a third embodiment of the optical recording medium driving apparatus according to the present invention. In this driving apparatus (optical recording medium driving apparatus), the voltage signals outputted from the current/voltage converting circuits 116 and 117 are amplified respectively by the amplifiers 118 and 119. The voltage signals amplified by the amplifiers 118 and 119 are given respectively to filter circuits 520 and 521 (low-pass filters), which shut down a signal whose frequency component is higher than that of the tracking error signal when the optical heads moves at the maximum speed, and are filtered thereby.

The voltage signals, which were filtered respectively by the filter circuits 520 and 521, are inputted into a differential amplifier 522, and the differential amplifier 522 outputs a difference signal of the voltage signals as a tracking error signal. The objective lens 114 is automatically tracked based on the tracking error signal, and the seek is again carried out the other parts of constitution are the same as those of the aforementioned driving apparatus shown in FIG. 6, so the description thereof is omitted.

In the driving apparatus having such a constitution, the filter circuits 520 and 521 filter respectively the voltage signals amplified by the amplifiers 118 and 119, and recovers the fall portions, where the frequency is comparatively higher and which are generated on the ID sections of the land portion and groove portion. The differential amplifier 522 outputs the difference signal of the recovered voltage signals as a tracking error signal. Therefore, a tracking error signal necessary for the accurate track count can be obtained.

Fourth Embodiment

Figure 9:
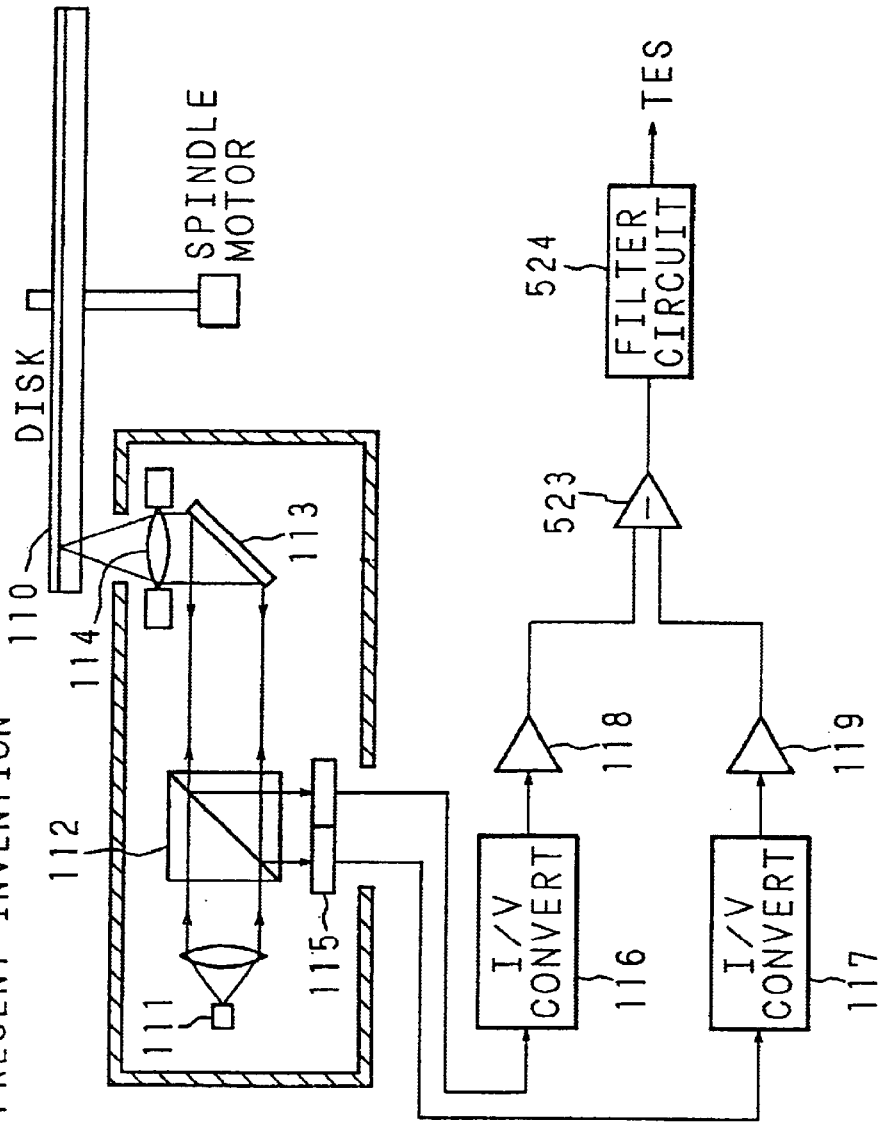
FIG. 9 is a block diagram showing a fourth embodiment of the optical recording medium driving apparatus according to the present invention.

FIG. 9 is a block diagram showing a fourth embodiment of the optical recording medium driving apparatus according to the present invention. In this driving apparatus (optical recording medium driving apparatus), the voltage signals, which were outputted respectively from the current/voltage converting circuits 116 and 117, are amplified respectively by the amplifiers 118 and 119. The voltage signals amplified by the amplifiers 118 and 119 are inputted into a differential amplifier 523, and the differential amplifier 523 outputs a difference signal of the voltage signals.

The difference signal outputted by the differential amplifier 523 is given to a filter circuit 524 (low-pass filter), which shuts down a signal whose frequency is higher than that of the tracking error signal when the optical head moves at the maximum speed, and is filtered thereby so as to be outputted as a tracking error signal. The objective lens 114 is automatically tracked based on the tracking error signal, and the seek is again carried out. The other parts of the constitution are the same as those of the aforementioned driving apparatus shown in FIG. 6, so the description thereof is omitted.

In the driving apparatus having such a constitution, the voltage signals are amplified by the amplifiers 118 and 119, and the difference signal of the voltage signals outputted from the differential amplifier 523 is filtered by the filter circuit 524. The filter circuit 524 recovers fall portions, where the frequency is comparatively higher and which are generated in the ID sections of the land portion and groove portion, and outputs the tracking error signal. Therefore, a tracking error signal necessary for the accurate track count can be obtained.

INDUSTRIAL APPLICABILITY

As mentioned above, according the present invention, a tracking error signal necessary for an accurate track count can be obtained.

In addition, according to the present invention, in the ID section of the land portion, amplitude of a signal based on an output signal from the peak-hold circuit becomes larger, and in the ID section of the groove portion, amplitude of a signal based on an output signal from the bottom-hold circuit becomes larger. When the signal whose amplitude is larger than the other is selected, namely, the signal whose fall was recovered is selected, a tracking error signal necessary for the accurate track count can be obtained.

In addition, according to the present invention, the low-pass filter filters a detected signal outputted from the detector, and recovers the fall portions, where the frequency is comparatively higher and which are generated in the ID sections of the land portion and groove portion. Since a signal based on the output from the low-pass filter is used as a tracking error signal, a tracking error signal necessary for the accurate track count can be obtained.

In addition, according to the present invention, the low-pass filter filters a difference signal of detected signals outputted from the two-piece detector and recovers fall portions, where the frequency is comparatively higher and which are generated in the ID sections of the land portion and groove portion. Since a signal based on the output from the low-pass filter is used as a tracking error signal, a tracking error signal necessary for the accurate track count can be obtained.

In addition, according to the present invention, since a detected signal is converted into current/voltage signal, the processes of amplification, comparison, filtering and the like can be performed easily. Therefore, a tracking error signal necessary for the accurate track count can be obtained.

Further, the present invention can be applied also to a recording medium adopting the conventional land recording system and groove recording system, and thus the present invention has low-order compatibility.

What is claimed is:

1. An optical recording medium driving apparatus for recording and/or reproducing data in/from an optical recording medium, where information can be recorded in plural tracks, based on a light emitted to the tracks of the optical recording medium, said driving apparatus characterized by comprising:

a detector for detecting a position of the emitted light;

a peak-hold circuit for holding a peak of a position detected signal outputted from said detector so as to output the position detected signal;

a bottom-hold circuit For holding a bottom of the position detected signal so as to output the position detected signal; and a switching circuit for switching signals based on the output signals from said peak-hold circuit and bottom-hold circuit so as to output either signal, wherein the signal outputted from said switching circuit is used as a tracking error signal.

2. The optical recording medium driving apparatus according to claim 1, wherein said switching circuit includes:

an absolute value circuit for outputting an absolute value of the signal based on the output signal from said peak-hold circuit;

an absolute value circuit for outputting an absolute value of the signal based on the output signal from said bottom-hold circuit; and a comparison circuit for comparing the absolute values outputted from said absolute value circuits so as to select either signal with a larger absolute value, wherein said switching circuit outputting the signal selected by said comparison circuit.

3. An optical recording medium driving apparatus for recording and/or reproducing data in/from an optical recording medium, where information can be recorded in plural tracks, based on a light emitted to the tracks of the optical recording medium, said driving apparatus characterized by comprising:

a two-piece detector for detecting positions of the emitted light;

two peak-hold circuits for holding peaks of position detected signals outputted from said two-piece detector so as to output the position detected signals;

two bottom-hold circuits for holding bottoms of the position detected signals so as to output the position detected signals; and a switching circuit for switching signals based on the output signals from said two peak-hold circuits and two bottom-hold circuits so as to output a signal, wherein the signal outputted from said switching circuit is used as a tracking error signal.

4. The optical recording medium driving apparatus according to claim 3, wherein said switching circuit includes:

an absolute value circuit for outputting an absolute value of a signal based on a difference signal of the output signals from said two peak-hold circuits;

an absolute value circuit for outputting an absolute value of a signal based on a difference signal of the output signals from said two bottom-hold circuits; and a comparison circuit for comparing the absolute values outputted by said absolute value circuits so as to select either signal with a larger absolute value, wherein said switching circuit outputting the signal selected by said comparison circuit.

5. An optical recording medium driving apparatus for recording and/or reproducing data in/from an optical recording medium, where information can be recorded in plural tracks, based on a light emitted to the tracks of the optical recording medium, said drive device characterized by comprising:

a detector for detecting positions of the emitted light;

a peak-hold circuit for holding a peak of a difference signal of position detected signals outputted from said detector so as to output the difference signal;

a bottom-hold circuit for holding a bottom of the difference signal so as to output the difference signal; and a switching circuit for switching the output signals from said peak-hold circuit and bottom-hold circuit so as to output either output signal, wherein the signal outputted from switching circuit is used as a tracking error signal.

6. The optical recording medium driving apparatus according to claim 5, wherein said switching circuit includes:

an absolute value circuit for outputting an absolute value of the output signal from said peak-hold circuit;

an absolute value circuit for outputting an absolute value of the output signal from said bottom-hold circuit; and a comparison circuit for comparing the absolute values outputted from said absolute value circuits so as to select either signal with a larger absolute value, wherein said switching circuit outputting the signal with the larger absolute value selected by said comparison circuit.

* * * * *